United States Patent
Baker et al.

(10) Patent No.: US 6,304,407 B1
(45) Date of Patent: Oct. 16, 2001

(54) SELF-WRITING OF SERVO PATTERNS BASED ON PRINTED REFERENCE PATTERN IN ROTATING DISK DRIVE

(75) Inventors: Bill Baker, Redwood City; Steven Lambert, San Jose; Jong Lin, Cupertino; Michael Anthony Moser, San Jose; Shu-Yu Sun, Saratoga, all of CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/182,105

(22) Filed: Oct. 27, 1998

(51) Int. Cl.[7] .................................................. G11B 21/02
(52) U.S. Cl. ............................................... 360/75; 360/17
(58) Field of Search ................................. 360/75, 15, 16, 360/17, 59

(56) References Cited

U.S. PATENT DOCUMENTS

| | | | |
|---|---|---|---|
| 3,512,170 | * 5/1970 | Nelson | 346/74.4 |
| 4,157,577 | 6/1979 | Porter, Jr. et al. | 360/77 |
| 4,488,187 | 12/1984 | Alaimo | 360/77 |
| 5,012,363 | 4/1991 | Mine et al. | 360/77.05 |
| 5,319,622 | * 6/1994 | Martin | 369/44.14 |
| 5,661,760 | 8/1997 | Patapoutian et al. | 375/341 |
| 5,668,679 | 9/1997 | Swearingen et al. | 360/75 |
| 5,771,130 | * 6/1998 | Baker | 360/75 |
| 5,793,559 | 8/1998 | Shepherd et al. | 360/78.09 |
| 5,796,543 | 8/1998 | Ton-That | 360/77.08 |
| 5,930,065 | * 7/1999 | Albrecht et al. | 360/72.2 |
| 5,963,391 | * 10/1999 | Nakagawa | 360/75 |
| 5,991,104 | * 11/1999 | Bonyhard | 360/15 |

FOREIGN PATENT DOCUMENTS 2255326   10/1990   (JP).

OTHER PUBLICATIONS

Bertram, et al., "The Print–Through Phenomenon", *J. Audio Engr. Soc.*, vol. 28, No. 10, Oct. 1980, pp. 690–705.
Ono, "Architecture and Performance of the ESPER–2 Hard–Disk Drive Servo Writer," *IBM J. Res. Develop.*, vol. 37, No. 1, Jan. 1993, pp. 3–11.
Mallinson, *The Foundations of Magnetic Recording*, 2d Ed., Academic Press, San Diego, CA. @1993, 1987, p. 32.
Baker et al, "Servotrackwriter with Improved Positioning System," *IEEE Trans. Mag.*, vol. 33, No. 5, Sep. 1997, pp. 2623–2625.

* cited by examiner

*Primary Examiner*—David Hudspeth
*Assistant Examiner*—Dan I. Davidson
(74) *Attorney, Agent, or Firm*—Michael Zarrabian (57) ABSTRACT

A coarse magnetic template pattern is transferred to a data storage surface of a disk by magnetic printing techniques. As printed, the template pattern essentially provides clocking and may provide radial position information. The disk is then assembled into a completed and enclosed disk drive. The template pattern is then used by the disk drive to self-write highly resolved product embedded servo patterns onto storage surfaces of each data disk including the surface having the printed template pattern.

20 Claims, 6 Drawing Sheets

LOGICAL COORDINATES

FIG. 7

SPATIAL COORDINATES

FIG. 9

SELF-WRITING OF SERVO PATTERNS BASED ON PRINTED REFERENCE PATTERN IN ROTATING DISK DRIVE

FIELD OF THE INVENTION

This invention relates generally to a method for writing embedded servo sector patterns within a rotating disk data storage device. More particularly, the present invention relates to drive self-writing of its own servo sector servo patterns based upon a template pattern printed on one, multiple or all surfaces of the disks of the drive.

BACKGROUND OF THE INVENTION

Disk drives are well known in the computer art for providing secondary mass storage with random access. A disk drive essentially comprises one or more magnetic data storage disks rotating on a spindle within an enclosed housing. A magnetic transducer head is positioned very closely to each data storage surface by a slider suspended upon an air bearing. Closest clearance between the smooth disk surface and the slider is typically on the order of one microinch, or less. This close proximity of the head to the disk surface enables very high-resolution data and servo patterns to be recorded onto the disk surface. Servo patterns are typically written in servo sectors which interrupt data sectors or blocks. Servo patterns provide the disk drive with head position information to enable a head positioner mechanism, such as a rotary voice coil positioner, to move the head from track to track during random access track seeking operations, and to maintain the head in proper alignment with a track centerline during track following operations when user data is written to or read from the available data block storage areas of the disk surface.

Data transducer heads currently being used employ dual elements. An inductive write element having a relatively wide recording gap is used to write information into the tracks, whereas a so-called giant-magneto-resistive read element having a relatively narrow playback gap is used to read information from the tracks. With this arrangement, data track densities equaling and exceeding 16,000 tracks per inch are possible, leading to disk drives in relatively small packages or form factors with very large data storage capacities. One drawback of using a narrow read element relative to a wider write element is that the fine position servo information needed to position the head over a particular track becomes more complex, requiring more servo bursts (circumferentially sequential, radially staggered single frequency bursts, pairs of which are sequentially read as the read element passes by a servo sector).

Servo patterns are written into the servo sectors of each disk conventionally with the aid of a servo writer at a point in the drive assembly process before the head disk unit is sealed against particulate contamination from the ambient. A servo writer is a complex and expensive manufacturing unit, typically stabilized on a large granite base to minimize unwanted vibration and employing e.g. laser interferometry for precise position measurements. The servo writer typically requires direct mechanical access to the head arm, and may also have a fixed head for writing a clock track onto one disk surface. Since direct access is required to the interior of the head-disk assembly of each disk drive unit, the servo writer is typically located within a so-called "clean room" in which the air is purged of impurities that might otherwise interfere with head-disk operations including the servo writing process. In one example, for a disk drive having two disks (four data storage surfaces) and requiring three servo-writer-controlled passes of the head over a single track during servo writing, total servo writing time might consume as much as 13.2 minutes. Thus, servo writing using servo writers in clean rooms requires either considerable capital investment in the manufacturing process or severe time penalties in the manufacturing process attributable to servo writer bottleneck. One very serious drawback relating to servo writers is that as track densities increase with evolving hard disk designs, servo writers become obsolete, and have to be replaced, or upgraded, at considerable capital expense.

This problem has not gone unnoticed in the art. One solution, proposed by workers at IBM, called for servo writing a master pattern at full resolution on one surface of a master disk during a pre-assembly operation. Then, a master disk with the master pattern was assembled with other blank disks into a disk drive unit. After the disk drive unit had been sealed against the ambient, the master servo pattern of the master disk was used as a reference by the disk unit in self-writing embedded sector servo patterns on each other data surface within the enclosed unit. Finally, the master pattern was erased; leaving the disk drive unit with properly located embedded servo sector patterns on every surface, including the surface which originally included the master pattern. This servo writing method is described in U.S. Pat. No. 5,012,363 to Mine et al, entitled: "Servo Pattern Writing Method for a Disk Storage Device", and is further described in a technical paper by Hiroyuki Ono, one of the named co-inventors of the '363 patent, in "Architecture and Performance of the ESPER-2 Hard-Disk Drive Servo Writer", *IBM J. Res. Develop*. Vol. 37, No. 1, January 1993, pp. 3–11. One of the noted drawbacks of the IBM approach is that the master unit was servo written on a different spindle than the disk drive spindle, and certain repeatable run out information had to be removed during the self-servo write operation. Another obvious drawback of the IBM approach is that some number of expensive servo writers would still be required to write the master patterns on some of the disks.

At the other end of proposed solutions is a complete disk drive self-servowrite operation. One such approach is described in commonly assigned U.S. Pat. No. 5,668,679 to Swearingen et al., entitled: "System for Self-Servowriting a Disk Drive", the disclosure thereof being incorporated herein by reference. The method of the '679 patent essentially comprises the steps of writing a clock track at an outside diameter (OD) recording region of a first disk surface of a disk drive having multiple storage surfaces, tuning an open-loop seek from OD to an inside diameter (ID) recording region to develop a repeatable seek profile, and recording a plurality of high frequency spiral tracks from OD to ID, each spiral track including embedded (e.g. missing bit) timing information. Then, spiral track provided peak data, and missing bit data, are read back. A voltage-controlled oscillator is locked to the timing information to track disk angular position. As the head is then moved radially from OD to ID the detected spiral peaks shift in time relative to a starting (index) mark, although the timing information does not shift. Embedded servo sectors can then be precisely written across the data storage surface by multiplexing between reading spirals and writing servo sectors (wedges). After the integrity of the wedges has been verified, the spirals are erased (over written with user data). While this system has been made to work well, challenges remain in generating and recording an accurate clock pattern on the first disk surface, and also in the time required to produce the master position pattern, on the first disk surface.

With the known drawbacks of servo writers and with self-servo writing, magnetic printing offers the possibility of a considerable improvement in the servo writing process. Magnetic printing comprises a direct transfer of magnetic patterns to a disk via a magnetic pattern or die, or by way of local heating above the Curie temperature as by laser beam, etc. One well-known and generally undesirable manifestation of magnetic printing is the "print-through" phenomenon. This phenomenon has been noted and explored, particularly in the field of magnetic audio recording tapes, see, e.g. Bertram, et al., "The Print-Through Phenomenon", *Journal of the Audio Engineering Society*, Vol. 28, No. 10, October 1980, pp. 690–705. While print-through of information recorded on magnetic tape at audio rates has resulted in annoying playback images occurring before and after the main recording, print-through has demonstrated the existence of the magnetic printing phenomenon for directly transferring a pattern recorded on a first magnetic medium onto a second magnetic medium brought into intimate contact with the first. Heating the second magnetic medium to approach or exceed the Curie temperature coupled with a flux-directing externally applied field is also known to facilitate direct transfer of magnetic patterns to a copy. While magnetic printing would seem to be an immediate solution to the difficulties with servo writers and with self servo writing techniques, one chief drawback of direct magnetic printing is that this process is reported to be unable to transfer high density information, such as magnetic patterns carrying video information, see Mallinson, *The Foundations of Magnetic Recording*, 2d Ed., Academic Press, San Diego, Calif., @1993, p. 32.

It is known within the disk drive art to position a data transducer head on the basis of timing differences derived from radially staggered disk servo patterns. The commonly assigned U.S. Pat. No. 5,668,679 referenced above is one example of such usage. Other examples of timing-based servo patterns are provided by U.S. Pat. No. 4,157,577 to Porter, Jr., entitled: "Rotatable Storage Apparatus with Digitally Responsive Circuitry for Track Selection"; and, U.S. Pat. No. 4,488,187 to Alaimo, entitled: "Servo Control Apparatus".

While the foregoing is thought to represent the state of the art, there has heretofore been no satisfactory application of magnetic printing as a replacement technology to servowriters or as an improvement to self-servowriting.

SUMMARY OF THE INVENTION WITH OBJECTS

One object of the present invention is to provide a method for using magnetic printing to create usable embedded servo patterns in high density disk drives in ways overcoming limitations and drawbacks of the prior art.

Another object of the present invention is to employ magnetically printed servo template patterns having a relatively low resolution to derive embedded servo patterns having a relatively high resolution without using a servo writer.

A further object of the present invention is to install a magnetically printed disk within a stack of disks of a disk drive in a clean environment as part of disk drive assembly, and then use the relatively coarse patterns printed on the printed disk to self-write high resolution servo patterns on other disk storage surfaces and on the printed surface, as well, in an external drive operating environment following disk drive assembly.

In accordance with principles of the present invention, a method for self-servowriting a disk drive includes a series of steps, preferably, although not necessarily, carried out within the disk drive assembly and bum-in process.

A first step includes transferring a low-resolution servo template pattern by magnetic printing onto a storage surface of a reference disk. Most preferably, the servo template pattern includes both clock and disk radial position information, although the template may comprise clocking information alone. Since the template pattern is transferred by magnetic printing techniques, the printed pattern features can have a resolution lower than a disk drive servo pattern specification based on head gaps and head widths of data transducers included in the disk drive.

A second step includes assembling the disk drive and includes the step of installing the reference disk, either alone, or with other blank disks into the disk drive, installing the data transducers, and then enclosing the disk drive to prevent intrusion of particulate contaminates from an external ambient environment.

Following the drive assembly and enclosure step, a third step includes reading the printed template pattern with the data heads of the disk drive in order to develop clock and position information needed by a drive head position servo loop for precisely positioning the data transducers at concentric track locations of disk storage surfaces at which specified embedded servo patterns are to be written.

A final step includes self-writing the disk drive servo patterns onto the storage surfaces at each of the concentric track locations with the data transducers in accordance with the disk drive servo pattern specification.

An additional aspect of this method calls for using the disk drive electronics in order to counteract any eccentricity of the printed reference pattern before carrying out the step of self-writing the disk drive servo patterns.

In one particularly preferred form, the step of printing the template pattern includes transferring radial segments separated by slanted segments, so that the radial segments provide clocking information and may also include some coarse position information, while the slanted segments provide more finely resolved relative radial position information. In this regard, the slanted segments may be stairstepped, and adjacent slanted segments may be radially displaced, e.g. into two sets of odd and even slanted segments.

In an alternative embodiment the step of printing the template pattern includes transferring multi-frequency segments, such that the multiple frequencies provide additional head position information.

Preferably, although not necessarily, the step of printing the template pattern is performed as a part of disk manufacture, which is necessarily conducted within a clean room environment.

Also, most preferably, the step of self-writing disk drive servo patterns is carried out at a self-scan station within the disk drive manufacturing operation following assembly and enclosure of the disk drive.

These and other objects, advantages, aspects, and features of the present invention will be more fully appreciated and understood upon consideration of the following detailed description of preferred embodiments presented in conjunction with the accompanying drawings.

DETAILED DESCRIPTION OF PREFERRED EMBODIMENTS

The present inventors have discovered that one limitation of magnetic printing processes, i.e. the inability to transfer finely resolved details needed for servo information, may be overcome by printing servo template patterns which contain magnetic transitions oriented primarily in the radial direction. The direction of magnetization is generally along the circumferential direction of the circular disk track in conventional fashion. Circumferential separation between adjacently printed segments may then be used to locate data tracks and enable self-servo-writing of servo patterns after disk drive assembly.

Figure 1:
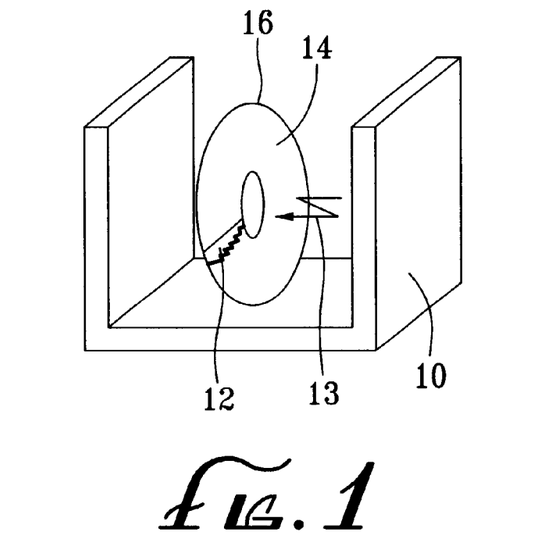
FIG. 1 is a highly diagrammatic representation of a magnetic printing station for printing a disk storage surface with a servo template pattern.

Accordingly, a magnetic printing station 10, shown diagrammatically in FIG. 1 magnetically prints or otherwise transfers in a known way a servo template pattern 12 to one surface 14 of a magnetic disk 16, known as a reference disk. The magnetic printing station may follow any one of a number of known magnetic transfer techniques. One method is to apply a unidirectional magnetic domain orientation to a blank storage disk. Then, a reticle or magnetic die having the desired magnetic template pattern is placed into close proximity with the disk, and the disk is heated to approach the Curie temperature of the magnetic storage media on the reference surface. A selective remagnetization of the reference surface is then carried out with the aid of a reverse bias field and e.g. localized heating in accordance with the reference pattern established by the reticle or die. If an optical reticle is used, intense local heating through reticle apertures may be obtained from a laser beam, for example, in accordance with well understood magneto-optical principles in order to provide selective magnetization of domains of the template-patterned surface in accordance with the pattern 12. Of course, care must be taken throughout the FIG. 1 printing process not to damage or contaminate the printed disk 16. Preferably, although not necessarily, the printing process is carried out in a very clean environment within a disk manufacturing process.

Figure 2:
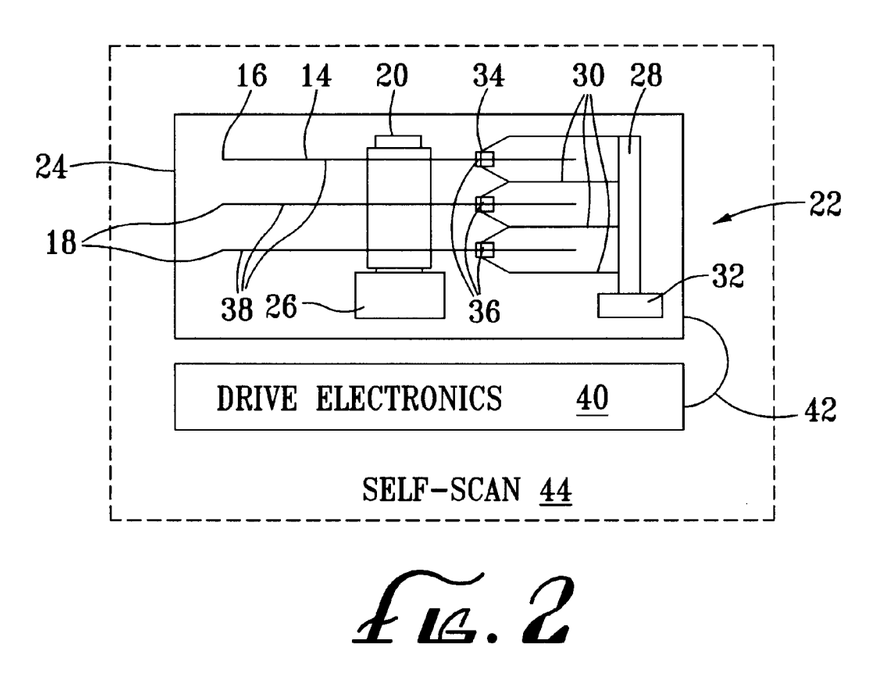
FIG. 2 is a diagrammatic view in elevation of a hard disk drive including a head-disk assembly including a template-patterned disk and several blank disks, and disk drive electronics, for self-servo-writing based on the template pattern within a self-scan station within the manufacturing process.

After a servo template pattern 12 has been applied to storage surface 14 of the printed disk 16, the printed disk 16 and other blank disks 18 are assembled onto a spindle 20 of a disk drive 22. The spindle 20 is mounted within a head-disk assembly (HDA) 24. The HDA 24 also includes a comb-like head actuator structure 28 having head arms 30 rotated by e.g. a rotary voice coil motor 32 in order to position heads 34 and 36 respectively adjacent to the template surface 14 of printed disk 16 and blank surfaces 38 of the disks 16 and 18. After the disks and heads are installed, the HDA 24 is enclosed by a cover which prevents intrusion of unwanted particulate contaminants. A drive electronics module 40, such as a printed circuit board carrying large scale integrated circuits and other components, is mechanically attached to the HDA 24 and electrically connected thereto by a suitable interconnection 42, in order to complete the assembly of the disk drive 22. Following assembly, the disk spindle 20 may be rotated at a predetermined angular velocity by a spindle motor 26, typically formed as an integral part of a base of the HDA 24. The disk drive 22 is then placed into a self-scan chamber 44 and connected to a suitable power supply 46 for operation. During self-scan operations, diskware data is downloaded to the disk drive 22, and a status collection computer 48 collects data concerning the disk drive 22 during its self-scan procedures.

Figure 9:
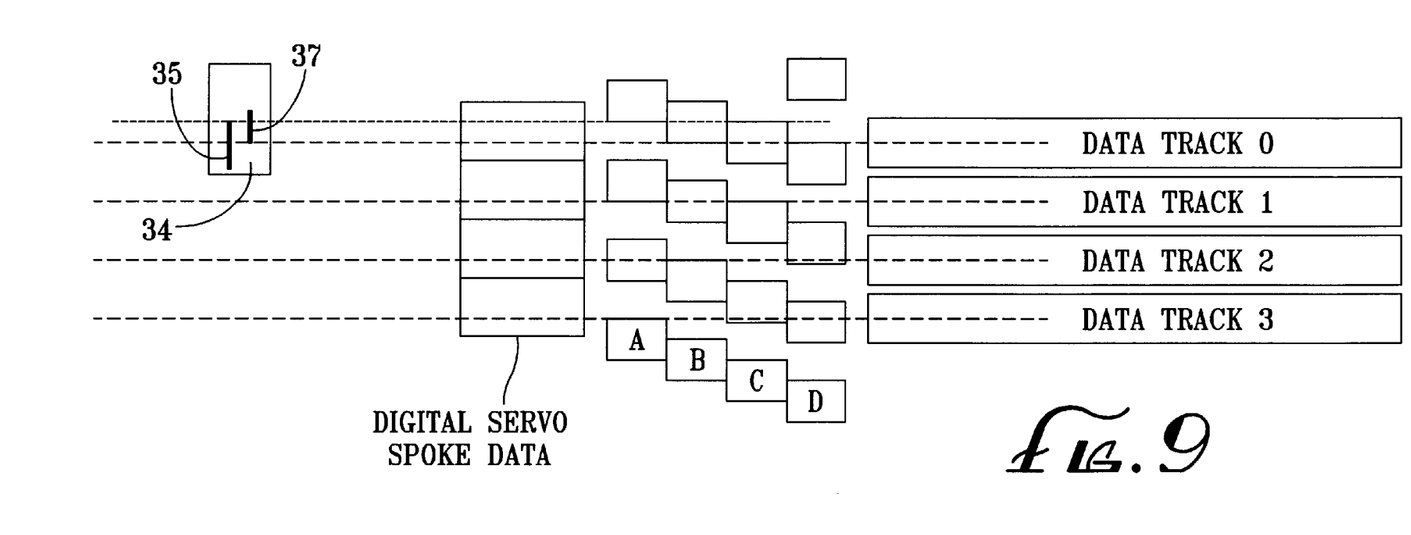
FIG. 9 shows a final servo pattern in a band of adjacent circumferential data tracks which has been self-written by the FIG. 2 assembled disk drive, based on the template pattern printed at the FIG. 1 printing station, in accordance with principles of the present invention.

Once activated, the computer 48 downloads a special program to the drive electronics which enables head 34 to read the template pattern 12, and in turn, enables each other head 36 to write precise servo patterns on each blank storage surface in accordance with a product servo pattern plan, see FIG. 9, discussed hereinafter. Since the template pattern 12 is transferred by the printing station 10 to the printed surface 14, the template pattern as printed will contain a repeatable run-out (RRO) after the disk 16 is mounted onto the spindle 20. The disk drive electronics 40 has sufficient digital computation and processing capability to execute e.g. a discrete Fourier transform algorithm and thereby remove the RRO positioning error as well as repeatable timing error from the template disk pattern, in accordance with known techniques. For example, the Ono article describing the IBM ESPER-2 hard drive servo writer referenced above describes a way for removing RRO.

After some or all of the other surfaces 38 have been written with final servo patterns, the template surface 14 is written with a final servo pattern, and the template pattern is then overwritten, either in the self-scan station 44, or later on with user data when the drive is installed in a user's computing environment for normal data storage and retrieval operations.

The present invention takes advantage of the observation that magnetic printing is most effectively accomplished by transferring relatively long flux transitions between circumferentially magnetized regions, and that those transitions may readily be read by a passing head 34 providing the transitions are generally transversely aligned to the travel path of the head about a locus of a circumferential track. By slanting one set of radial segments 52 relative to a generally radial set 50 of segments, and by stairstepping the slanted sets to maintain adjacency relative to the radial segments, a repeating reference pattern providing relative radial position is obtained.

Figure 3:
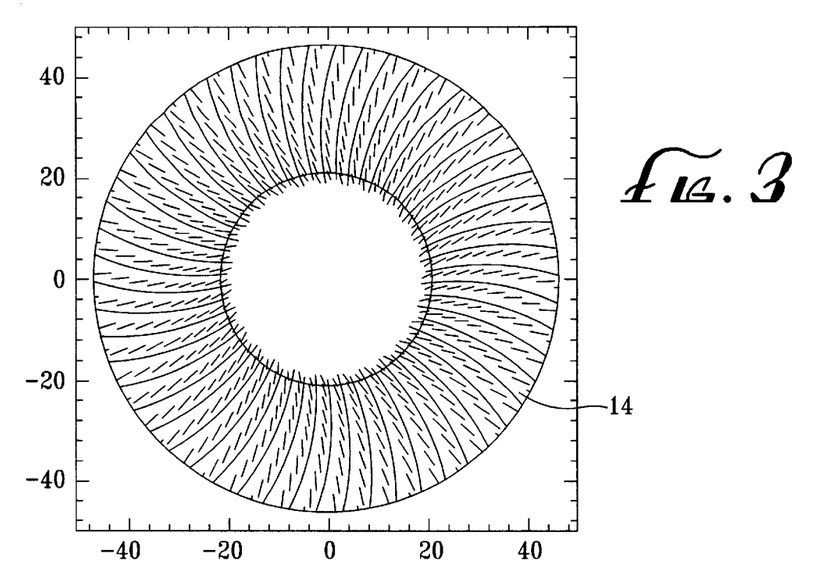
FIG. 3 is a diagrammatic plan view of a view of a servo template pattern in accordance with aspects of the present invention transferred to a disk surface by the FIG. 1 printing station.
Figure 4:
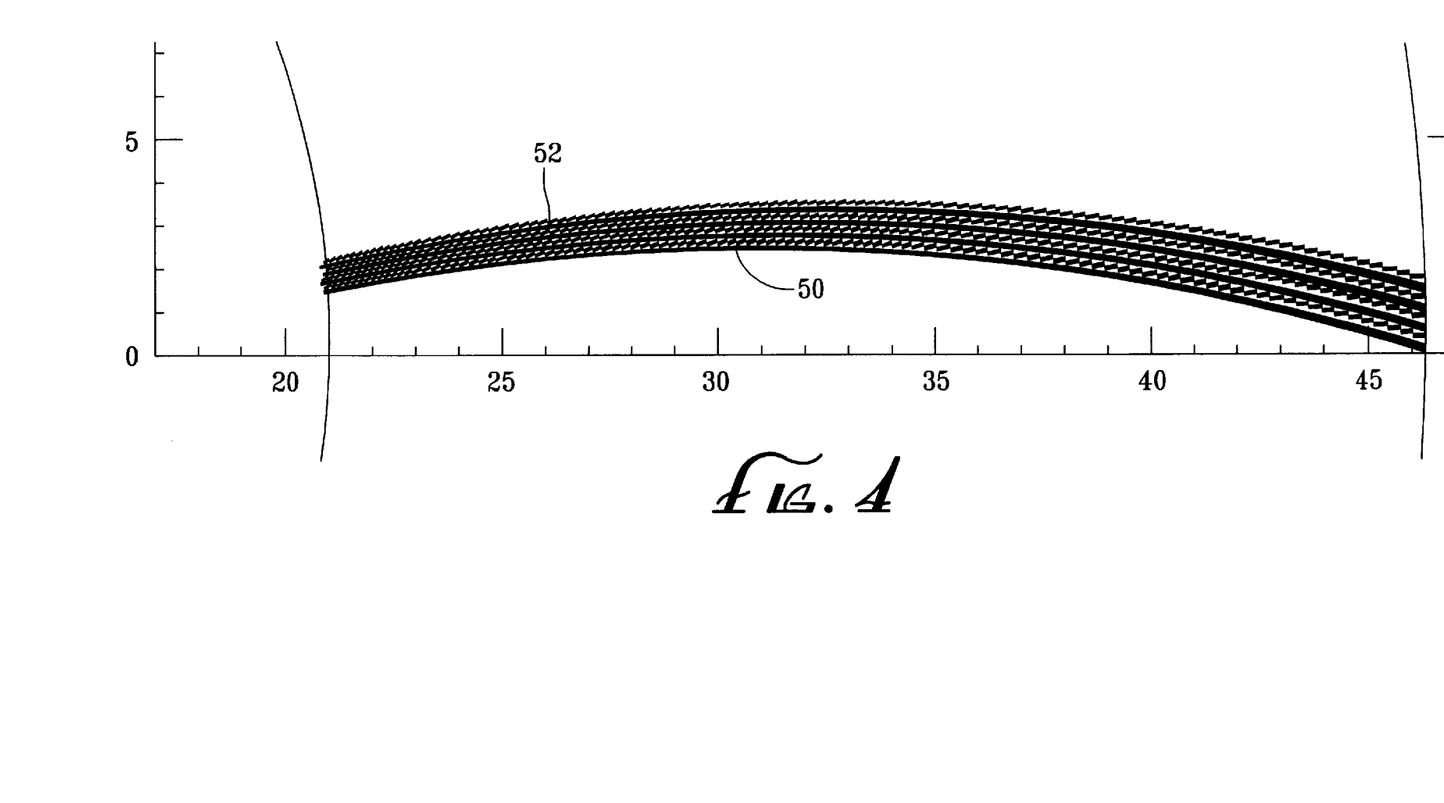
FIG. 4 is an enlarged view of several adjacent radial reference segments and timing segments printed onto the template-patterned disk at the FIG. 1 printing station.
Figure 5:
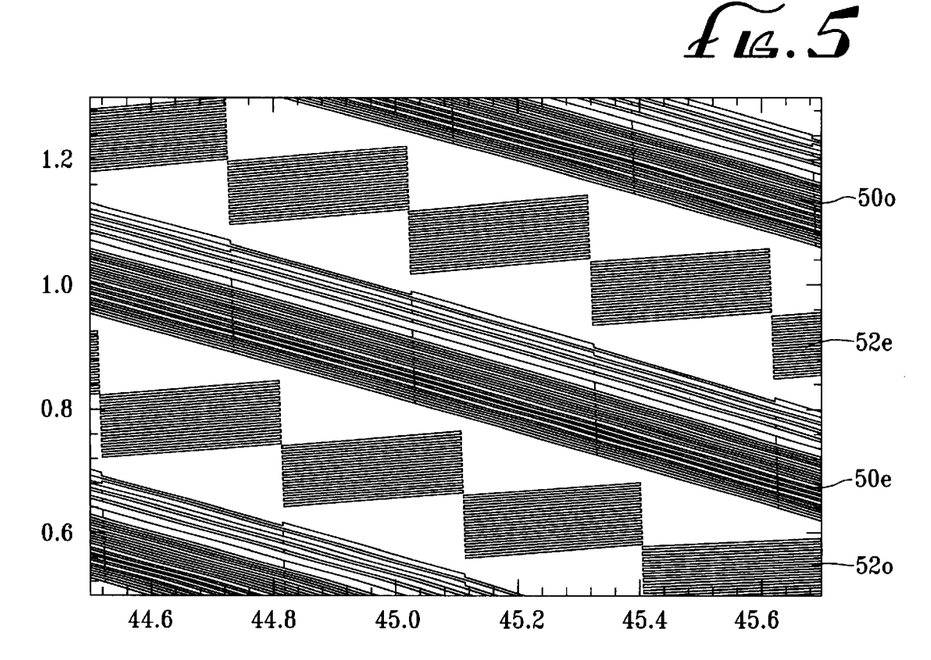
FIG. 5 is an enlarged plan view of a portion of the FIG. 4 view, showing the spatial relationship between the reference and timing segments.

Referring now to FIG. 3, the printed surface 14 is preferably printed with a repeating pattern of radial segments 50, and slanted, stairstep segments 52. FIG. 3 illustrates fifty-four sets of radial segments 50 and slanted segments 52. Twenty-seven of the fifty-four sets provide even timing and even slanted segments, while the other twenty-seven of the sets provide odd timing and odd slanted segments which are radially half-stepped relative to the even slanted segments. FIG. 4 shows four adjacent sets of even and odd segments 50 and 52, along a scale (millimeters) indicating relative size of a 95 mm (3.5 inch) standard recording disk used as the reference disk 14. FIG. 5 presents a greatly enlarged view of several of the sets depicted in FIGS. 3–4. In FIG. 5 an even radial segment 50e is followed by an even slanted segment 52e. Slanted segment 52e is, in turn, followed by an odd radial segment 50o. Similarly, before the even radial segment 50e, an odd slanted segment 50o appears.

Figure 6A:
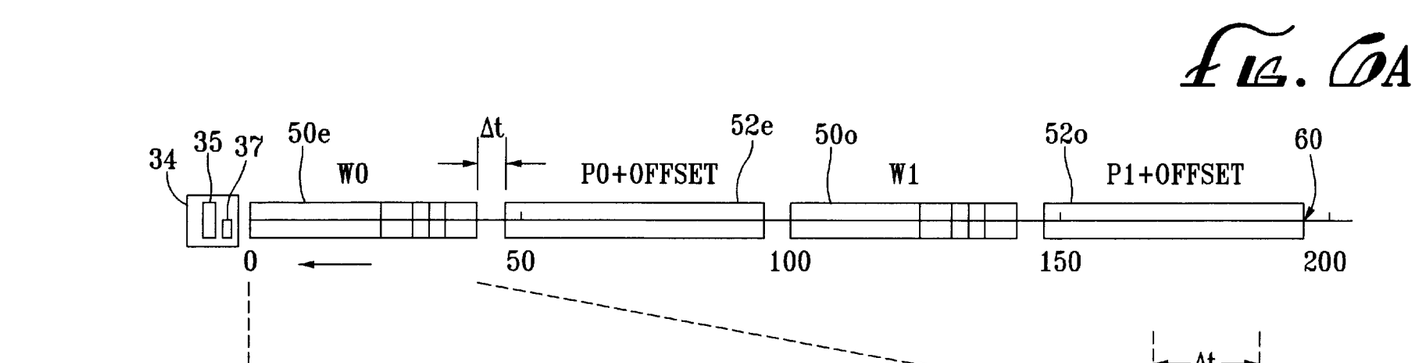
FIG. 6 is a set of graphs depicting a linearized portion of a radial reference segment printed at the FIG. 1 printing station.

The slanted, stairstep segments 52 are preferably printed as a series of generally radial magnetic transitions at a constant flux pitch or reversal frequency. The radial segments 50, moreover, may also be recorded to provide radial position information. Such information is schematically depicted in the FIG. 6 graph. FIG. 6A depicts a circumferential track 60 across the template pattern 12 of the head 34. (In FIG. 6A, the head 34 is shown to include an inductive write element 35 and a magneto-resistive or giant magneto-resistive (GMR) read element 37 narrower than the write element 35; in this example, the effective write gap width of the writer element 35 determines the width of the track 60). In this example of FIG. 6, the head 34 successively passes by an even radial segment 50e, an even slanted segment 52e, an odd radial segment 50o, and an odd slanted segment, 52o as the track 60 moves past the head 34 during rotation of the printed disk 14 within the disk drive 22.

Figure 6B:
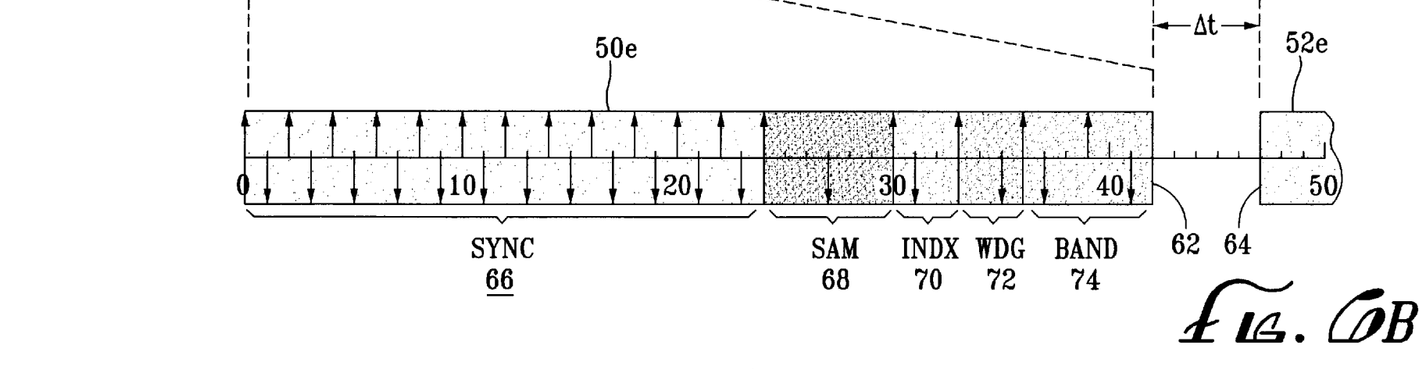
Figure 6C:
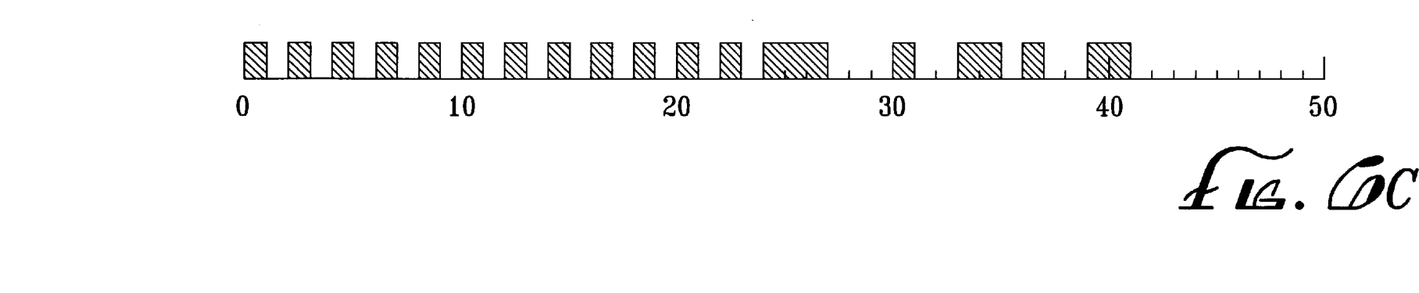

Relative radial position of the head 34 within a band defined by the extent of a slanted segment 52 can be readily determined by measuring a differential time between passage of a trailing edge 62 of the radial segment 60 by the head 34, and arrival of a leading edge 64 of the next slant segment 52 at the head 34 (shown as Δt in FIG. 6A). FIG. 6B expands the even radial segment 50o depicted in FIG. 6A in order to illustrate other information which may be transferred by printing. This information may include a fixed-frequency synchronization pattern 66 of circumferential flux reversals, a servo address mark 68, an index flux reversal 70 present in a predetermined one of the segments 60 to mark track beginning of the reference pattern, a servo wedge identifier field 72 which passage of the e.g. fifty-four radial sets of radial and slanted segments, and a band identifier field 74 which identifies the particular radial band of the adjacent slanted segment, e.g. segment 52e. FIG. 6C depicts a cross-section of a reticle or die pattern suitable for printing the fields 66, 68, 70, 72, and 74 of each radial segment 50.

The above discussion uses the differential time suggested by the symbol At in FIG. 6B to determine radial position. Generally, other methods including phase detection of the bursts 50e and 52e in FIG. 5 may provide more accurate detection of head radial position.

Figure 7:
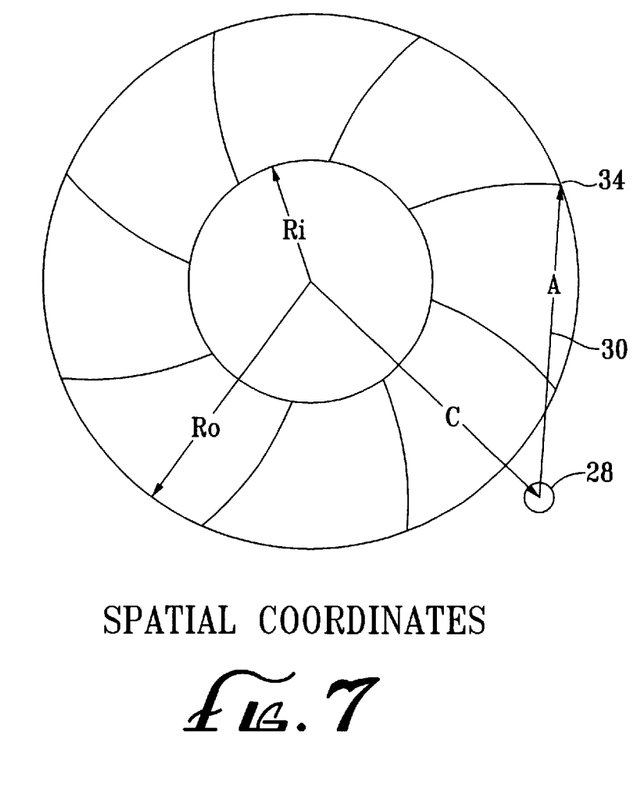
FIG. 7 illustrates spatial considerations and constraints of the printed template pattern in relation to the FIG. 2 disk drive architecture.
Figure 8:
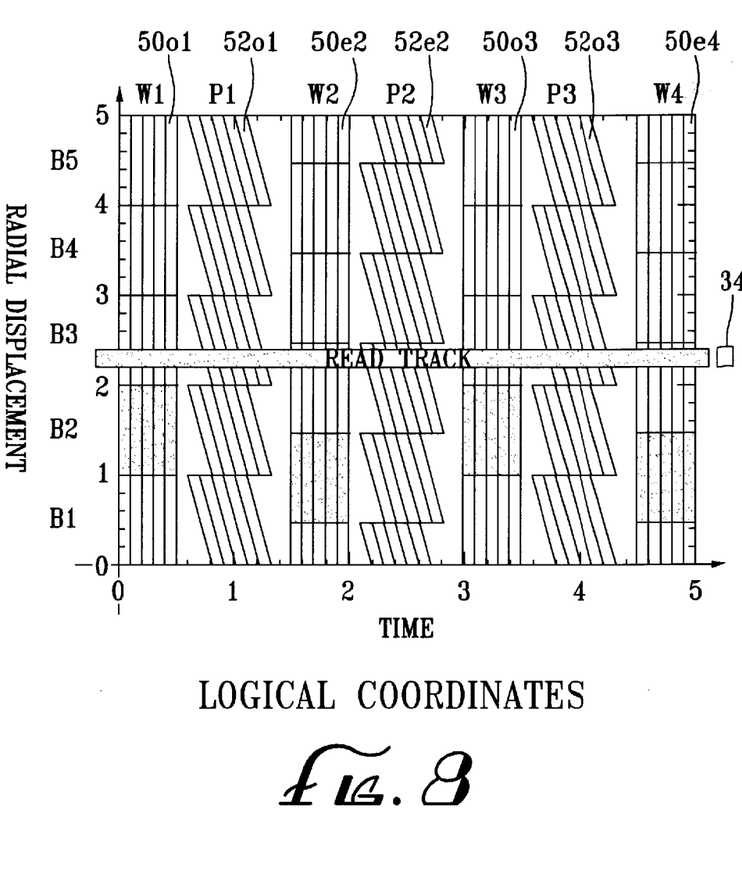
FIG. 8 shows use of the printed template pattern to obtain a precisely located data track having a track resolution (density) much higher than the printed template pattern in accordance with aspects of the present invention.

FIG. 7 shows the generally arcuate radial path followed by the head 34 across the disk 14. The arc of the head 34 is a function of the length (A) of the head arm 30 and the distance (C) between the pivot point of the rotary actuator 28 and the rotational axis of the spindle 20 and the reference disk 14. The extent of the arc is a function of the disk outer radius (Ro) and disk inner radius (Ri). FIG. 8 depicts the head 34 and a track 60 defined across several of the radial and slanted segments, progressively 50o1, 52o1, 50e2, 52e2, 50o3, 52o3, 50e4, etc. It can be determined by inspection of FIG. 8 that at the particular track 60, a greater distance exists between the end of radial segment 50o1 and the beginning of slanted segment 52o1, than exists between the end of radial segment 50e2 and the beginning of slanted segment 52e2, since slanted segment 52e2 is radially offset from the slanted segment 52o1. In this manner, when a stairstep discontinuity occurs in e.g. the even slanted segments 52e, the odd slanted segments 52o provide full continuity and an accurate time differential, and vice versa.

Once repeatable runout and repeatable timing errors have been removed from the template pattern, and the disk drive servo loop has positioned one of the heads 36 over a substantially concentric track location above one of the rotating blank disks 18, a final servo pattern may be written, at a relatively fine resolution defined by the write element 35 of the head 36. For example, in FIG. 9, the write element 35 will record a synchronous servo pattern comprising digital data for synchronization, servo address mark, track number, head number, etc., followed by e.g. an untrimmed burst field pattern which repeats radially over several tracks. Each servo burst requires a separate pass of the disk 18 by the write element 35. After first bursts, such as A bursts, are written, the head 34 is stepped e.g. one half data track pitch, and the next bursts, e.g. bursts B, are written on the track. Then, the head 34 is stepped one half track pitch, and third bursts, e.g. bursts C, are written. The head is then stepped one half track pitch, and fourth bursts, e.g. bursts D, are written. Other patterns and servo burst pitches are also known and used. This writing of finely resolved data bursts to product specification occurs throughout the radial extent of the data storage area of the disk 18. Once one data surface is written with embedded servo sectors or wedges, a next surface may be written. In some disk drives having powerful write channels, or when servo patterns are staggered from surface to surface, it is practical to write multiple storage surfaces with servo patterns during a single revolution.

Since the GMR read element 37 is considerably narrower than the inductive write element 35, it is necessary to provide several pairs of burst circumferential edges across the pitch of each track. For example, adjacent circumferential edges of bursts A and B provide one servo location, whereas adjacent circumferential edges of bursts D and E provide another servo location. Adjacent circumferential edges of bursts B and C provide a third servo location, while adjacent circumferential edges of bursts E and F provide a fourth servo location, etc.

Those skilled in the art will appreciate that the printed servo template pattern 12, once printed onto a surface 14 of a printed disk 16 and following installation of the printed disk into the disk drive 22, provides the same positioning function as a servowriter, at far less capital investment. While the self-scan, self-servowrite process may require greater time than without self-servowrite, this operation is carried out after the disk drive is fully assembled, sealed against particulate contamination, and integrated with its electronics. This extended burn-in time period is very useful, in that most disk drive failures occur during the initial burn-in interval. Those disk drives surviving self-scan, burn-in, self-servowrite, are more likely to work reliably in the field.

While the present invention has been explained in terms of a single template pattern 12 on a disk 16, under some conditions of very high track densities, it may be useful or necessary to print template patterns on all disk surfaces, and then use the template pattern of a particular surface to generate and write a final servo pattern for that particular surface. This requirement may arise in conditions when vibration or turbulence otherwise cause excessive deviation of a particular head from a desired location even though another head of the drive is accurately following a printed reference pattern. In effect, the mechanical tolerances in a particular drive, or drive design, may require that each head be separately controlled with its own position reference when self-writing the product servo pattern. This approach may also be particularly useful for heads with dual-stage actuators, since each head could follow the local printed servo template pattern while writing high resolution product servo patterns onto the same storage surface.

A single surface of a multi-surface disk drive may have a magnetically printed template pattern which is used to provide clock information for writing all of the surfaces. This approach can enable servowriting outside of a clean room environment, when it is combined with a light-transparent head-viewing window of the HDA housing and non-contact head positioning enabled by external servo writing equipment, such as an optical push-pin servowriter, see e.g. Bill R. Baker and Alex Moraru, "Servotrackwriter with Improved Positioning System, *IEEE Trans. on Magnetics*. Vol. 33, No. 5, September 1997, pp. 2623–2625.

In summary, the present invention eliminates the expensive contact servowriter and servowriting operations within an expensive clean room environment. A low resolution printed servo template pattern, preferably transferred to disk as part of the disk manufacturing operation, is used to facilitate self-servowrite of a disk drive to product servo pattern specification after the particular drive has been fully assembled, sealed from the ambient, and checked out both mechanically and electrically. In effect, the printed template pattern and disk become a self-contained servowriter, providing both clock and position information inside of the drive. This approach enables higher TPI compared to present servowriters, as servowriter positioning errors and low frequency relative motion between head and disk are eliminated. In addition, the data track pitch can be optimized for each separate disk storage surface, fully enabling optimized TPI, since it can be made cost effective to have long self-servowrite times once the servowriters are eliminated. This self-servowrite approach using printed servo patterns enables and facilitates self-servowrite over multiple product generations and considerable increases in TPI densities.

Eccentricity in the printed servo template pattern can be removed by software/signal processing present within the disk drive electronics, and embedded servo sectors following true circular tracks can be written. In the self-servowrite process, product servo information can be written directly on the printed surface 14, either overwriting the printed template patterns or being written into unprinted areas of the surface 14. The printed template pattern can be lower density and lower quality than the final product servo pattern, since the entire data region between the final product embedded servo sectors can be used to contain the printed servo template patterns. Such low resolution printed template patterns can be used during self-servowrite even though they give poor performance in long track seeks. The printed template patterns may include timing-based positional information as illustrated above, or the patterns may be frequency-encoded, i.e. different frequencies are printed on adjacent segments of the template pattern, etc. Examples of frequency-based servo patterns for disk drives are given in commonly assigned U.S. Pat. No. 5,661,760 to Patapoutian et al., entitled: "Wide BiPhase Digital Servo Information Detection, and Estimation for Disk Drive Using Servo Viterbi Detector" (see in particular FIG. 13E); and, U.S. Pat. No. 4,188,646 to Sordello, entitled: "Sectorized Data Path Following Servo System". The disclosures of these two patents are incorporated herein by reference.

It is to be understood that the particular implementations described are intended as illustrations of, and not as limiting the scope of, the claims. It will of course be appreciated that in the development of any such actual implementation, numerous implementation-specific decisions must be made to achieve the developers' specific goals, such as compliance with system-related and business-related constraints and that these goals will vary from one implementation to another. Moreover, it will be appreciated that such a development effort might be complex and time-consuming, but would nevertheless be a routine undertaking of engineering for those of ordinary skill having the benefit of this disclosure.

Although the present invention has been described in terms of the presently preferred embodiment, it should be clear to those skilled in the art that the present invention may also be utilized in conjunction with other servo patterns and storage devices using servo patterns. Thus, it should be understood that the instant disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for self-servowriting a disk drive comprising the steps of:

transferring a magnetic pattern by magnetic printing onto at least one storage surface of a disk, wherein a resulting printed magnetic pattern includes servo information and wherein the printed magnetic pattern has a resolution lower than a disk drive servo pattern specification based on head gaps of data transducers included in the disk drive, assembling the disk drive including installing the disk into the disk drive and enclosing the disk and the data transducers within a housing sealed against particulate contamination from an external ambient environment, reading the printed magnetic pattern in order to aid precise positioning of the data transducers relative to storage locations defined by disk storage surfaces, self-writing disk drive servo patterns onto the storage surfaces at the concentric track locations with the data transducers in accordance with the disk drive servo pattern specification after the disk and data transducers have been enclosed within the housing.

2. The method set forth in claim 1 wherein the printed magnetic pattern includes servo clock information indicative of head circumferential relative position.

3. The self-servowriting method set forth in claim 2 further comprising the steps of providing a light-transparent window in the disk drive for non-invasive optical sensing of head position, and determining head radial relative position optically via the light transparent window during the step of self-writing disk drive servo patterns.

4. The method set forth in claim 1 wherein the printed magnetic pattern includes servo radial position information indicative of head radial relative position.

5. The method set forth in claim 1 wherein the magnetic pattern is printed onto both surfaces of the disk.

6. The method set forth in claim 1 wherein the disk drive comprises multiple data storage disks, and wherein the magnetic pattern is printed onto all available storage surfaces of said disks.

7. The method set forth in claim 6 wherein the steps of reading the template pattern and self-writing disk drive servo patterns are carried out separately for each of the storage surfaces by reading a template pattern of a said surface and then self-writing the disk drive servo pattern onto said surface.

8. The self-servowriting method set forth in claim 1 comprising the further step of using disk drive electronics to counteract at least one of eccentricity and timing non-uniformity of the printed magnetic pattern before self-writing the disk drive servo patterns.

9. The self-servowriting method set forth in claim 1 wherein the step of printing the magnetic pattern includes tansferring radial segments separated by slanted segments, wherein the radial segments provide clocking information, and the slanted segments provide relative radial position information.

10. The self-servowriting method set forth in claim 9 wherein the radial segments primarily provide clocking information and also provide coarse radial position information.

11. The self-servowriting method set forth in claim 9 wherein the slanted segments are stairstepped, and adjacent slanted segments are radially displaced.

12. The self-servowriting method set forth in claim 11 wherein the adjacent slanted segments are radially displaced into two sets of odd and even slanted segments.

13. The self-servowriting method set forth in claim 1 wherein the step of printing the magnetic pattern includes transferring multi-frequency segments, wherein the multi frequencies provide head position information.

14. The self-servowriting method set forth in claim 1 wherein the step of printing the magnetic pattern is carried out in a clean environment as part of disk manufacture.

15. The self-servowriting method set forth in claim 1 wherein the step of self-writing disk drive servo patterns is carried out at a self-scan station within the disk drive manufacturing operation.

16. A method for self-servowriting a disk drive with the aid of a template pattern transferred by magnetic printing onto a storage surface of a first disk, wherein the printed magnetic template pattern includes clock and disk radial position information and wherein template pattern features have a resolution lower than a disk drive servo pattern features specification based on head gap widths of disk drive data transducers to be included in the disk drive, comprising the steps of
assembling the disk drive including installing the first disk and the disk drive data transducers into a housing of the disk drive and enclosing the housing to prevent entry of external particulate contaminants, and following the assembly step:
reading the printed magnetic template pattern with a disk drive data transducer in order to precisely locate and maintain the data transducer at concentric data track storage locations of a disk storage surface, and
self-writing disk drive servo patterns onto the storage surfaces of the first disk at the concentric track locations with the disk drive data transducers in accordance with the disk drive servo pattern specification.

17. The method for self-servowriting a disk drive set forth in claim 16 wherein the disk drive comprises multiple disks and storage surfaces, and the assembling step includes installing the multiple disks along with the first disk, and the step of self-writing disk drive servo patterns comprises writing disk drive servo patterns onto the storage surfaces of the multiple disks with the aid of the printed template pattern.

18. The method for self-servowriting a disk drive set forth in claim 16 wherein a template pattern has been transferred by magnetic printing onto each of a plurality of storage surfaces of a plurality of disks, wherein the step of assembling the disk drive includes installing the plurality of disks onto a common spindle, and wherein the steps of reading the template pattern and self-writing disk drive servo patterns are carried out separately for each of the storage surfaces by reading a template pattern of a said surface and then self-writing the disk drive servo pattern onto said surface.

19. The method for self-servowriting a disk drive set forth in claim 16 wherein the template pattern transferred by magnetic printing onto a storage surface of a first disk comprises servo clock information, wherein the disk drive as assembled includes a transparent servo window providing external viewing of head position of a head within the disk drive, and wherein the step of self-writing disk drive servo patterns is carried out by optically determining head radial relative position externally of the disk drive via the light transparent window.

20. The method for self-servowriting a disk drive set forth in claim 16 wherein said disk drive includes programmable electronics and comprising a further step after the reading step and before the writing step of counteracting eccentricity of the printed magnetic template pattern by loading and executing a self-servowrite program with said disk drive electronics which automatically counteracts at least one of said eccentricity timing non-uniformity of the printed magnetic template pattern.

* * * * *